United States Patent [19]
Malloy et al.

[11] Patent Number: 5,196,040
[45] Date of Patent: Mar. 23, 1993

[54] GREASE TRAP AND FILTER APPARATUS

[75] Inventors: Patrick A. Malloy, Hanover Park; Jean L. Jodoin, Buffalo Grove; Charles M. Murphy, Hanover Park; Christopher S. Barry, Elgin; Kevin R. Chwala, Sleepyhollow; Charles E. Bain, West Dundee, all of Ill.

[73] Assignees: Grease Guard, Inc., Schaumburg; Dundee Manufacturing Co. Inc., Carpentersville, both of Ill.

[21] Appl. No.: 519,738

[22] Filed: May 7, 1990

[51] Int. Cl.$^5$ .............................................. B01D 35/02
[52] U.S. Cl. ........................................ 55/323; 55/350; 55/486; 55/511; 55/DIG. 36; 126/299 R; 454/49
[58] Field of Search ................. 55/486, 487, 321, 323, 55/506, 510, 350, DIG. 36, 316, 511; 126/299 D, 299 E, 300, 301, 299 R; 428/297; 98/115.1, 42.21, 42.22; 210/489, 538–540; 454/49

[56] References Cited

U.S. PATENT DOCUMENTS

| | | | |
|---|---|---|---|
| 3,566,585 | 3/1971 | Voloshen et al. | 55/DIG. 36 |
| 3,660,969 | 5/1972 | Fox | 55/DIG. 36 |
| 3,695,164 | 10/1972 | Stalker | 126/299 D |
| 3,760,566 | 9/1973 | Zievers et al. | 55/510 X |
| 4,325,290 | 4/1982 | Wolfert | 98/42.21 |
| 4,450,756 | 5/1984 | Kling | 126/299 D X |
| 4,610,705 | 9/1986 | Sarnosky et al. | 55/DIG. 36 |
| 4,673,423 | 6/1987 | Yumlu | 55/321 X |
| 4,887,588 | 12/1989 | Rial | 126/299 R |

OTHER PUBLICATIONS

Cook; "Cook's Grease Terminator"; Loren Cook Co.; Mar. 1989.

Primary Examiner—Richard L. Chiesa
Attorney, Agent, or Firm—Trexler, Bushnell, Giangiorgi & Blackstone, Ltd.

[57] ABSTRACT

A grease filter and collection assembly for roof ventilators and the like includes a frame structure having a generally central aperture through which a grease discharge vent projects when the frame structure and trap assembly are installed surrounding the vent, and a replaceable grease-trapping material is removably secured in the frame structure so that the grease-trapping material is exposed within the aperture for trapping grease discharged from the vent. In a preferred embodiment, the frame structure is assembled from extruded frame members which integrally include a plurality of channels for securing and mounting the assembly for retaining the grease-trapping material within the frame structure. Upper and lower channels accommodate corner connections of the frame members. The frame members have side walls which peripherally enclose the grease-trapping material which is tucked between the upper and lower channel inwardly extending from the side wall. A preferred grease-trapping material includes a layered composite of grease filtering and trapping materials in which an upper-porous layer for trapping particulate debris is also permeable for passage of liquid grease therethrough into a lower layer which absorbs and retains the grease.

40 Claims, 2 Drawing Sheets

GREASE TRAP AND FILTER APPARATUS

BACKGROUND OF THE INVENTION

This invention relates to traps for collecting and disposing of air-borne grease such as in kitchen ventilation systems, and more particularly relates to protective trapping of grease accumulating at roof-mounted power ventilators.

Particularly in the restaurant installations, high volumes of grease discharge from roof-mounted ventilators commonly results in accumulated grease attacking and deteriorating typically organic roofing materials and the flashing and gaskets of the ventilator installations. Efforts to develop systems such as sandboxes and mechanical apparatus for collecting the grease discharge from roof-mounted ventilators have generally resulted in problems aggravated by weather exposure. Both conventional "up-blast" and "down blast" types of roof ventilators are subject to such grease-collection problems and consequent roof damage, particularly with a ventilator installation on a flat roof and even at side discharge installations. Puddling of the heated, acidic grease discharged onto flat roofs is a particularly acute roof deterioration problem with down blast ventilators. Puddling of grease is also a fire hazard as well as a footing hazard to roof workers.

These disadvantages are eliminated by grease trapping and filtering apparatus in accordance with the present invention.

SUMMARY OF THE INVENTION

In accordance with the present invention, a grease filter and collection assembly for roof ventilators and the like includes a frame structure having a generally central aperture through which a grease discharge vents projects when the frame structure and trap assembly are installed surrounding the vent, and a replaceable grease-trapping material is removably secured in the frame structure so that the grease-trapping material is exposed within the aperture for trapping grease discharged from the vent. In a preferred embodiment, the frame structure is assembled from extruded frame members which integrally include a plurality of channels for securing and mounting the assembly for retaining the grease-trapping material within the frame structure. Upper and lower channels accommodate corner connections of the frame members. The frame members have side walls which peripherally enclose the grease-trapping material which is tucked between the upper and lower channel inwardly extending from the side wall. An additional channel is exteriorly exposed in each of the frame members to enable access to the fasteners and hardware for mounting the collection assembly on a roof or wall through the vent projects.

A preferred grease-trapping material includes a layered composite of grease filtering and trapping materials in which an upper-porous layer for trapping particulate debris is also permeable for passage of liquid grease therethrough into a lower layer which absorbs and retains the grease. A barrier layer is disposed below the grease-trapping layer so that neither water nor grease can pass further downwardly to the roof. The intermediately located grease-trapping layer is permeable to water and preferably hydrophobic to prevent any retention of water and interference with the grease-absorbing capacity of the trapping material. The entire layered composite of filtering and trapping materials is conveniently removed from the frame structure for periodic replacement without requiring disassembly of the frame structure.

DESCRIPTION OF THE PREFERRED EMBODIMENT

Figure 1:
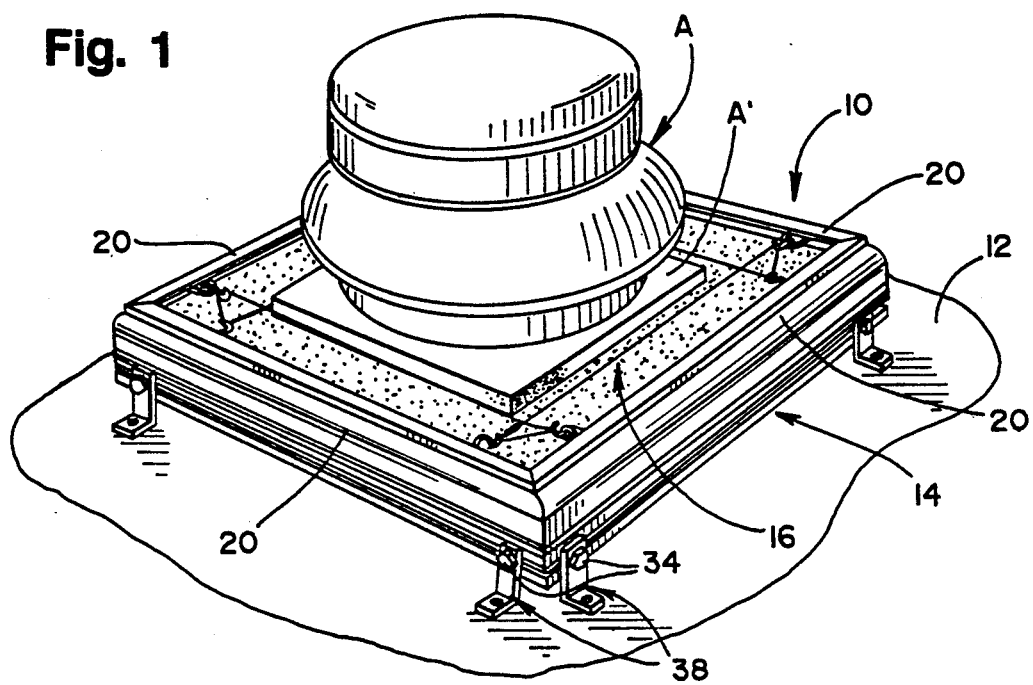
FIG. 1 is a perspective view of an embodiment of the grease collection assembly surrounding a power ventilator installed on a roof to be protected from the discharged grease.
Figure 2:
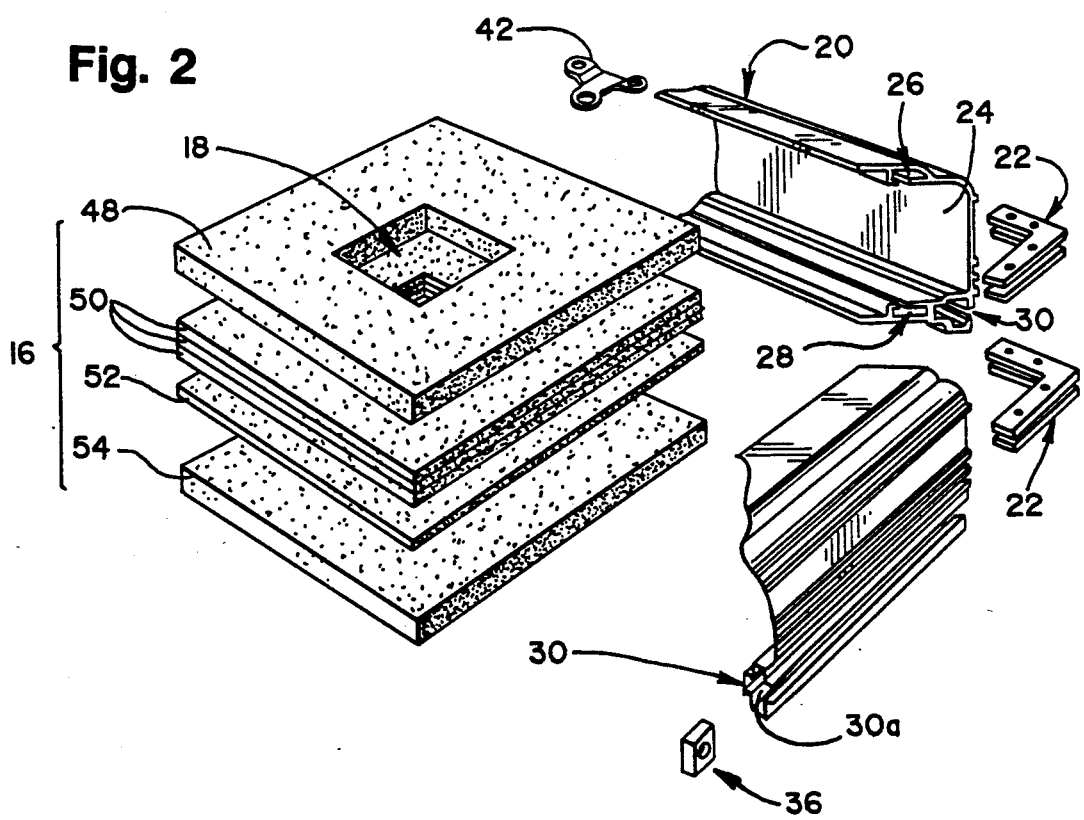
FIG. 2 is a fragmentary, exploded perspective view of a portion of the grease collection assembly shown in FIG. 1.

Referring to FIG. 1, an embodiment of the grease collection apparatus in accordance with the present invention is designated generally by reference character 10 which is installed on a roof 12 surrounding a "downblast" type roof discharge power ventilator A. The collection apparatus 10 has a rectilinear frame structure generally designated by reference character 14 which peripherally supports and secures a multi-ply grease filtering and trapping material composite 16. As shown in FIG. 2, the layered composite 16 is centrally apertured at 18 to allow passage therethrough of ventilation conduit (not shown) discharging downwardly around ventilator base A' which overlies the aperture 18.

The frame structure 14 is assembled from four, miter-joined frame members 20. Each of the frame members 20 is a linearly extruded length of preferably anodized aluminum which is impervious to all weather conditions. During assembly and installation of the collection apparatus 10, the mitered frame members 20 are joined with conventional screw-tightened bracket-shim connectors 22 as further shown in FIGS. 2 and 3 and more fully described hereinafter. The assembled frame structure 14 is then laid around the motor base A' centered within, after which the multiple layers of the composite 16 (more fully described hereinafter) are measured, cut preferably in either one or two pieces allowing for the aperture 18 and laid into the supporting frame structure 14 in the proper order so that cut joints of the layers are staggered and not vertically aligned to prevent any potential short circuit seepage of water or grease between layers through joint cuts.

Figure 3:
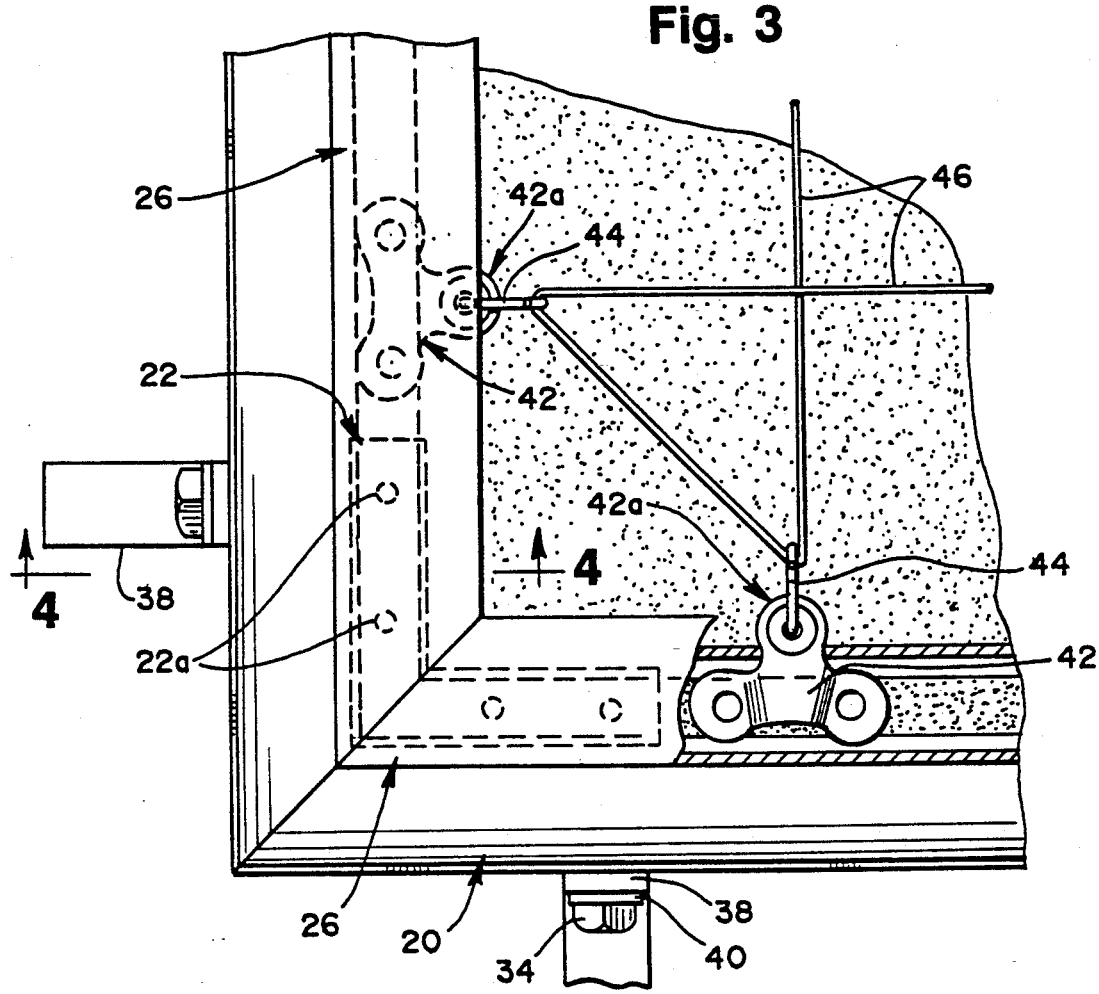
FIG. 3 is a top plan view of a portion of the grease collection assembly shown in FIG. 1.
Figure 4:
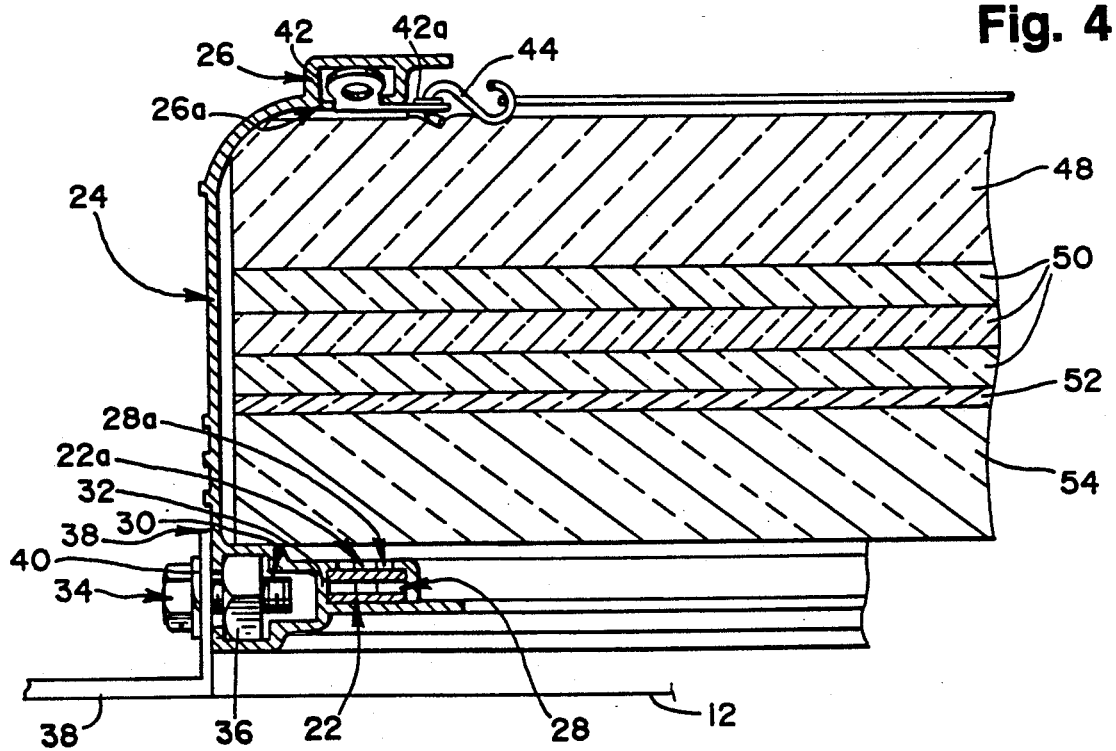
FIG. 4 is a vertical, sectional view taken along a plane designated by line 4—4 in FIG. 3.

Referring again to FIG. 2, each of the frame members 20 includes side wall 24 with an integrally extruded upper channel 26 and a pair of adjacent lower channels 28 and 30 which share a common wall 32 as best shown in FIG. 4 corner connectors 22, 22 bridge the respective upper channels 26, 26 and the lower interior channels 28, 28 of the respectively joined frame members 20, 20 as shown in FIGS. 2-4. Both the upper channel 26 and lower interior channel 28 are provided with respective elongate openings 26a and 28a in order to provide access for tightening the connector screws 22a as best shown in FIG. 4. The lower channel 30 has an exteriorly exposed elongate opening 30a in order to enable inwardly projecting bolts 34 to be threaded through nuts 36 installed within the channels 30 for securely mounting the frame members 20 and frame structure 14 onto the supporting hold down brackets 38 which are apertured for passage of the bolts 34 carrying lock washers 40. The hold down brackets 38 are appropriately configured and fastened for the particular type of roof 12 as shown in FIG. 1. The hold down brackets 38 are also dimensioned to elevate the frame structure 14 from the roof at an appropriate distance governed by any accumulation of water experienced particularly with installation on a flat roof 12, so that accumulated water on the roof cannot enter the exposed underside of the grease trapping composite material 16. Additionally, conventional snap hangers 42 are installed within the upper channels 26 as best shown in FIGS. 3 and 4 and project through the bottom opening 26a so that the integral eyes 42a inwardly project from the channels to accept S hooks 44; the S hooks 44 anchor a continuous length of tensioned wire 46, for example monofilament nylon, which is strung through the arrangement of S hooks 44 as shown in FIGS. 1, 3 and 4, in order to hold down the layered composite 16 as well as adding further rigidity to the frame structure 14.

As best shown in FIGS. 2 and 4, the layered composite 16 includes an upper layer 48 of porous, filtering material which retains generally particulate debris but allows condensed, heated grease to pass through. The upper layer of filter material can be, for example, approximately 1" thick and have porosity, for example of approximately 60 denier to promote minimal resistance to the passage of the heated grease. Suitable material for the upper filter layer 48 include foam polyester and similar highly porous suitable materials. Since the layer 48 is exposed, it should also be UV stable. Below the upper filter layer 48 is a series of three inner or intermediate layers 50 which absorb and retain the grease which is passed through the upper filter layer 48. The grease trapping layers 50 are also preferably hydrophobic to allow water to pass through for promotion of the grease trapping capacity. When three layers of the grease trapping material 50 are employed, each layer 50 can have a thickness, for example, of approximately ⅛". Suitable materials for the grease trapping layers 50 include for example polyolefin-based materials such as fibrous polypropylene commercially available from 3M Corporation under tradename OIL SORBENT ™ and similar materials. OIL SORBENT is a particularly preferred material which will retain as much as 19 times its own weight in grease. While three grease-trapping layers 50 are preferred, less than three of these layers may be employed with appropriate increase in thickness for comparable grease trapping capacity.

Below the grease-trapping layers 50, a barrier layer 52 obstructs any passage of grease or water, so that water cannot pass upwardly therethrough from the roof to interfere with grease-trapping of the upper layers, nor will any grease pass downwardly through the barrier layer 52 toward the roof. Suitable materials for the barrier layer 52 include impenetrable materials, for example polyurethane film and similar materials. A particularly preferred material for the barrier layer 52 includes fibrous, grease-trapping material bonded to an impermeable liner such as the material commercially available under the tradename SORBX ™ manufactured by Matarah Industries Inc. of Milwaukee, Wis. SORBX is available in multiple, suitable grades in which fibrous cellulose is bonded to polypropylene and/or polyethylene, in a representative, relative composition including 37% polypropylene, 52% fibrous cellulose, and 10% polyethylene.

An additional porous bottom layer 54 can be employed for spacing the grease filtering and trapping layers 48, 50, 52 above any standing water and to promote air circulation and water evaporation throughout the assembly 10.

The entire layered composite 16 is conveniently removed and replaced without disassembly of the frame structure 14, at scheduled periods governed by the volumetric rate of grease discharged from the ventilator, generally without regard to variable weather conditions.

In light of the foregoing description of one embodiment of the grease collection assembly according to the present invention, modifications will be evident and are within the broad scope of the appended claims and equivalents thereof.

The invention is claimed as follows:

1. A grease trap and filter assembly for roof ventilators, comprising:
   a) a frame structure having an aperture through which a grease discharge vent can project surrounded by said frame structure and trap assembly; and
   b) a replaceable, grease-trapping material removably securable in said frame structure and exposed within said aperture and having a passageway aligned with said aperture for passage of said vent therethrough, for trapping grease discharged from said vent surrounded by said grease-trapping material which comprises an upper, porous layer for trapping particulate debris and being permeable for passage of liquid grease therethrough, and a first lower layer for absorbing grease passing through said upper layer.

2. An assembly according to claim 1, wherein said frame structure peripherally encloses and supports said grease-trapping material.

3. An assembly according to claim 2, wherein said frame structure comprises an integrally extruded frame member having a plurality of channel portions for securing and mounting said assembly and for retaining the grease-trapping material within the frame structure.

4. An assembly according to claim 3, wherein said channels extend in parallel arrangement along said frame member.

5. An assembly according to claim 3, wherein said frame member further comprises an upstanding side wall laterally enclosing said grease-trapping material, said side wall separating an upper channel from at least one lower channel.

6. An assembly according to claim 5, wherein said frame member includes first and second lower channels.

7. An assembly according to claim 6, wherein said first and second lower channels share a common wall.

8. An assembly according to claim 6, wherein said first lower channel is arranged interiorly of said frame structure in relation to said second lower channel.

9. An assembly according to claim 6, wherein said second channel has an elongate, exterior opening for projection and access to mounting structure for supporting installation of said assembly.

10. An assembly according to claim 3, further comprising connector means for joining two of said frame members in said assembly installation.

11. An assembly according to claim 10, wherein said connector means are disposed within at least one of said channels.

12. An assembly according to claim 11, wherein a plurality of said frame members are joined to define a rectilinear frame structure, and wherein a plurality of corner brackets are disposed within respective frame members to secure rectilinear joints therebetween.

13. An assembly according to claim 12, wherein first and second said frame members are joined by first and second connector means respectively disposed within and bridging respective upper and lower channels of said respective first and second frame members.

14. An assembly according to claim 1, wherein said frame structure has a composition comprising anodized aluminum.

15. A grease trap and filter assembly for roof ventilators, comprising:
   a) a frame structure having an aperture through which a grease discharge vent can project surrounded by said frame structure and trap assembly; and
   b) a replaceable, grease-trapping material removably securable in said frame structure and exposed within said aperture for trapping grease discharged from said vent surrounded by said grease-trapping material;
   wherein said frame structure peripherally encloses and supports said grease-trapping material, said frame structure comprising an integrally extruded frame member having a plurality of channel portions for securing and mounting said assembly and for retaining the grease-trapping material within the frame structure, and wherein said grease-trapping material comprises an upper, porous layer for trapping particulate debris and being permeable for passage of liquid grease therethrough, and a first lower layer for absorbing grease passing through said upper layer.

16. An assembly according to claim 15, wherein said upper layer has a composition comprising foamed polyester.

17. An assembly according to claim 15, wherein said upper layer has a porosity of approximately 60 denier.

18. An assembly according to claim 15, wherein said lower layer has a composition comprising fibrous polyolefin.

19. An assembly according to claim 18, wherein said polyolefin comprises polypropylene.

20. An assembly according to claim 18, further comprising a barrier layer disposed below said lower layer and obstructing any passage of water or grease therethrough.

21. An assembly according to claim 20, wherein said barrier layer has a composition comprising polyurethane.

22. An assembly according to claim 20, wherein said barrier layer comprises fibrous material bonded to an impermeable liner.

23. An assembly according to claim 22, wherein said fibrous material comprises at least one composition selected from the group consisting of polypropylene, cellulose, and polyethylene.

24. An assembly according to claim 23, wherein said impermeable liner has a composition comprising polyurethane.

25. An assembly according to claim 15, further comprising a bottom layer below said lower layer for spacing said upper and lower layers from standing water and promoting air circulation thereunder.

26. An assembly according to claim 25, wherein said bottom layer comprises porous material.

27. A grease trap and filter assembly for roof ventilators, comprising:
   a) a frame structure having a central aperture through which a grease discharge vent projects surrounded by said frame structure and trap assembly, said frame structure being separate and spaced from said grease discharge vent; and
   b) a replaceable, grease-trapping material removably securable in said frame structure and exposed within said aperture and having a passageway aligned with said aperture for passage of said vent therethrough, for trapping grease discharged from said vent surrounded by said grease-trapping material and comprising an upper, porous layer for trapping particulate debris and being permeable for passage of liquid grease therethrough, and a first lower layer for absorbing grease passing through said upper layer.

28. An assembly according to claim 27, wherein said frame structure peripherally encloses and supports said grease-trapping material.

29. An assembly according to claim 28, wherein said frame structure comprises an integrally extruded frame member having a plurality of channel portions for securing and mounting said assembly and for retaining the grease-trapping material within the frame structure.

30. An assembly according to claim 29, wherein said channels extend in parallel arrangement along said frame member.

31. An assembly according to claim 29, wherein said frame member further comprises an upstanding side wall laterally enclosing said grease-trapping material, said side wall separating an upper channel from at least one lower channel.

32. An assembly according to claim 31, wherein said frame member includes first and second lower channels.

33. An assembly according to claim 32, wherein said first and second lower channels share a common wall.

34. An assembly according to claim 32, wherein said first lower channel is arranged interiorly of said frame structure in relation to said second lower channel.

35. An assembly according to claim 32, wherein said second channel has an elongate, exterior opening for projection and access to mounting structure for supporting installation of said assembly.

36. An assembly according to claim 29, further comprising connector means for joining two of said frame members in said assembly installation.

37. An assembly according to claim 30, wherein connector means are disposed within at least one of said channels.

38. An assembly according to claim 37, wherein a plurality of said frame members are joined to define a rectilinear frame structure, and wherein a plurality of corner brackets are disposed within respective frame members to secure rectilinear joints therebetween.

39. An assembly according to claim 31, wherein first and second said frame members are joined by first and second connector means respectively disposed within and bridging respective upper and lower channels of said respective first and second frame members.

40. An assembly according to claim 27, wherein said frame structure has a composition comprising anodized aluminum.

* * * * *